US006393374B1

(12) United States Patent
Rankin et al.

(10) Patent No.: US 6,393,374 B1
(45) Date of Patent: May 21, 2002

(54) PROGRAMMABLE THERMAL MANAGEMENT OF AN INTEGRATED CIRCUIT DIE

(75) Inventors: Linda J. Rankin, Beaverton; Edward A. Burton, Hillsboro, both of OR (US); Stephen H. Gunther, Folsom, CA (US); Jack D. Pippin, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/281,237

(22) Filed: Mar. 30, 1999

(51) Int. Cl.$^7$ ................................................ G01N 25/00

(52) U.S. Cl. ......................................... 702/132; 374/11

(58) Field of Search ............................... 702/132, 133, 702/134; 361/93.8, 97, 103, 106; 374/11, 30, 102, 103, 152, 170, 182, 179; 713/300, 322, 323, 324

(56) References Cited

U.S. PATENT DOCUMENTS

| 4,432,031 A | 2/1984 | Premerlani |
| 4,442,972 A | 4/1984 | Sahay et al. |
| 4,488,824 A | 12/1984 | Salem |
| 4,591,855 A | 5/1986 | Blackburn |
| 4,751,405 A | 6/1988 | Bufano, Jr. et al. |
| 4,779,161 A | 10/1988 | DeShazo, Jr. |
| 4,787,007 A | 11/1988 | Matsumura et al. |
| H562 H | 12/1988 | Irachier et al. |
| 4,789,819 A | 12/1988 | Nelson |

(List continued on next page.)

FOREIGN PATENT DOCUMENTS

EP 0523736 A1 1/1993

OTHER PUBLICATIONS

Sanchez et al. Thermal Management System for High Performance PowerPC Microprocessors—IEEE Compcon 97 Feb., 1997 pp: 325–330.
Shu–Yuan Chin & Chung–Yu Wu, "A New Type of Curvature–Compensated CMOS Bandgap Voltage References", VLSITSA, 1991, pp. 398–402.
Marco Ferro, Franco Salerno & Rinaldo Castello, "A Floating CMOS Bandgap Voltage Reference for Differential Applications", IEEE: Journal of Solid–StateCircuits, vol. 24, No. 3, Jun. 1989, pp. 690–697.
O. Salminen & K. Halonen, "The Higher Order Temperature Compensation of Bandgap Voltage References", IEEE, 1992, pp. 1388–1391.
Hector Sanchez et al., "Thermal Management System for High Performance Power PC Microprocessors", IEEE, Compcon '97, Feb. 1997, pp. 325–330.
Phillip E. Allen & Douglas R. Holberg, "CMOS Analog Circuit Design", HRW, pp. 529–551.
"Low Power, Programmable Temperature Controller", Rev. C, Analog Devices, Inc., 1995, pp. 1–16.

Primary Examiner—Patrick Assouad
Assistant Examiner—Edward Raymond
(74) Attorney, Agent, or Firm—Blakely, Sokoloff, Taylor & Zafman LLP

(57) ABSTRACT

A method and apparatus for power throttling to manage the temperature of an IC. A temperature sensor is manufactured on the same die as the IC components. The temperature sensor generates an output in response to junction temperature of the IC components. A state machine is coupled to receive the output of the temperature sensor and to provide power reduction functions in response to the temperature sensor output exceeding a maximum thermal value. The maximum thermal value is less than the maximum allowable temperature of the IC corresponding to maximum power consumption. Thus, the invention reduces power consumption at a thermal value lower that a potentially catastrophic value rather than shutting down the IC when catastrophic failure is imminent.

13 Claims, 5 Drawing Sheets

U.S. PATENT DOCUMENTS

| | | |
|---|---|---|
| 4,799,176 A | 1/1989 | Cacciatore |
| 4,807,144 A | 2/1989 | Joehlin et al. |
| RE32,960 E | 6/1989 | Levine |
| 4,851,987 A | 7/1989 | Day |
| 4,903,106 A | 2/1990 | Fukunaga et al. |
| 4,924,112 A | 5/1990 | Anderson et al. |
| 4,935,864 A | 6/1990 | Schmidt et al. |
| 5,008,771 A | 4/1991 | Palara |
| 5,025,248 A | 6/1991 | Bergeron |
| 5,064,296 A | 11/1991 | Huijsing et al. |
| 5,077,491 A | 12/1991 | Heck et al. |
| 5,085,526 A | 2/1992 | Sawtell et al. |
| 5,087,870 A | 2/1992 | Salesky et al. |
| 5,105,366 A | 4/1992 | Beckey |
| 5,149,199 A | 9/1992 | Kinoshita et al. |
| 5,170,344 A | 12/1992 | Berton et al. |
| 5,189,314 A | 2/1993 | Georgiou et al. |
| 5,195,827 A | 3/1993 | Audy et al. |
| 5,253,938 A | 10/1993 | Stixrud |
| 5,255,149 A | 10/1993 | Matsuo |
| 5,283,631 A | 2/1994 | Koerner et al. |
| 5,287,292 A | 2/1994 | Kenny et al. |
| 5,291,607 A | 3/1994 | Ristic et al. |
| 5,325,286 A | 6/1994 | Weng et al. |
| 5,359,234 A | 10/1994 | Atriss et al. |
| 5,359,236 A | 10/1994 | Giordano et al. |
| RE34,789 E | 11/1994 | Fraden |
| 5,422,832 A | 6/1995 | Moyal |
| 5,440,305 A | 8/1995 | Signore et al. |
| 5,451,892 A | 9/1995 | Bailey |
| 5,453,682 A | 9/1995 | Hinrichs et al. |
| 5,483,102 A | 1/1996 | Neal et al. |
| 5,560,017 A | 9/1996 | Barrett et al. |
| 5,586,270 A | 12/1996 | Rotier et al. |
| 5,838,578 A | 11/1998 | Pippin |
| 6,192,479 B1 | 2/2001 | Ko |

US 6,393,374 B1

PROGRAMMABLE THERMAL MANAGEMENT OF AN INTEGRATED CIRCUIT DIE

FIELD OF THE INVENTION

The invention relates to thermal management. More specifically, the invention relates to programmable thermal management for integrated circuit (IC) dice.

BACKGROUND OF THE INVENTION

As integrated circuit (IC) dice become more densely packed with circuit components and operating frequencies increase, power consumption of these ICs increases. Increased power consumption results in increased operating temperature, which if not controlled can cause catastrophic failure of the IC.

Prior thermal solutions include heat sinks, liquid cooling, fans, etc. Prior Art Power management include reduced operating frequency, and shutting down of a clock signal for a period of time, etc. Combination of thermal solutions and power management often allows an IC to operate within an acceptable thermal range. However, typical prior art power management solutions require hardware-software interaction, which increases complexity, latency and efficiency as compared to a hardware based solution.

At some combination of operating frequency and circuit density prior art thermal solutions are no longer adequate. Also, prior art thermal solutions are designed based on worst case scenarios, which is inefficient for ICs that do not operate in the worst case scenarios for significant periods of time. What is needed is improved, programmable thermal and power management control for ICs.

SUMMARY OF THE INVENTION

A method and apparatus for thermal management for an integrated circuit (IC) is described. A junction temperature for an integrated circuit is determined and compared to a thermal maximum value that is less than a predetermined value for the integrated circuit. Power consumption of the integrated circuit is reduced when the junction temperature reaches the predetermined value. In one embodiment, the predetermined value is programmable. In another embodiment, reduction of power consumption is accomplished by turning off and on a clock signal in a programmable manner.

DESCRIPTION OF THE DRAWINGS

The invention is illustrated by way of example, and not by way of limitation, in the figures of the accompanying drawings in which like reference numerals refer to similar elements.

DETAILED DESCRIPTION

A method and apparatus for thermal management of an integrated circuit (IC) is described. In the following description, for purposes of explanation, numerous specific details are set forth in order to provide a thorough understanding of the present invention. It will be apparent, however, to one skilled in the art that the invention may be practiced without these specific details. In other instances, well-known structures and devices are shown in block diagram form in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The invention provides power throttling to manage the temperature of an IC. A temperature sensor is manufactured on the same die as the IC components. The temperature sensor generates an output in response to junction temperature of the IC components. A state machine is coupled to receive the output of the temperature sensor and to provide power reduction functions in response to the temperature sensor output reaching a maximum thermal value. Thus, the invention reduces power consumption at a thermal value lower that a potentially catastrophic value rather than shutting down the IC when catastrophic failure is imminent.

Figure 1:
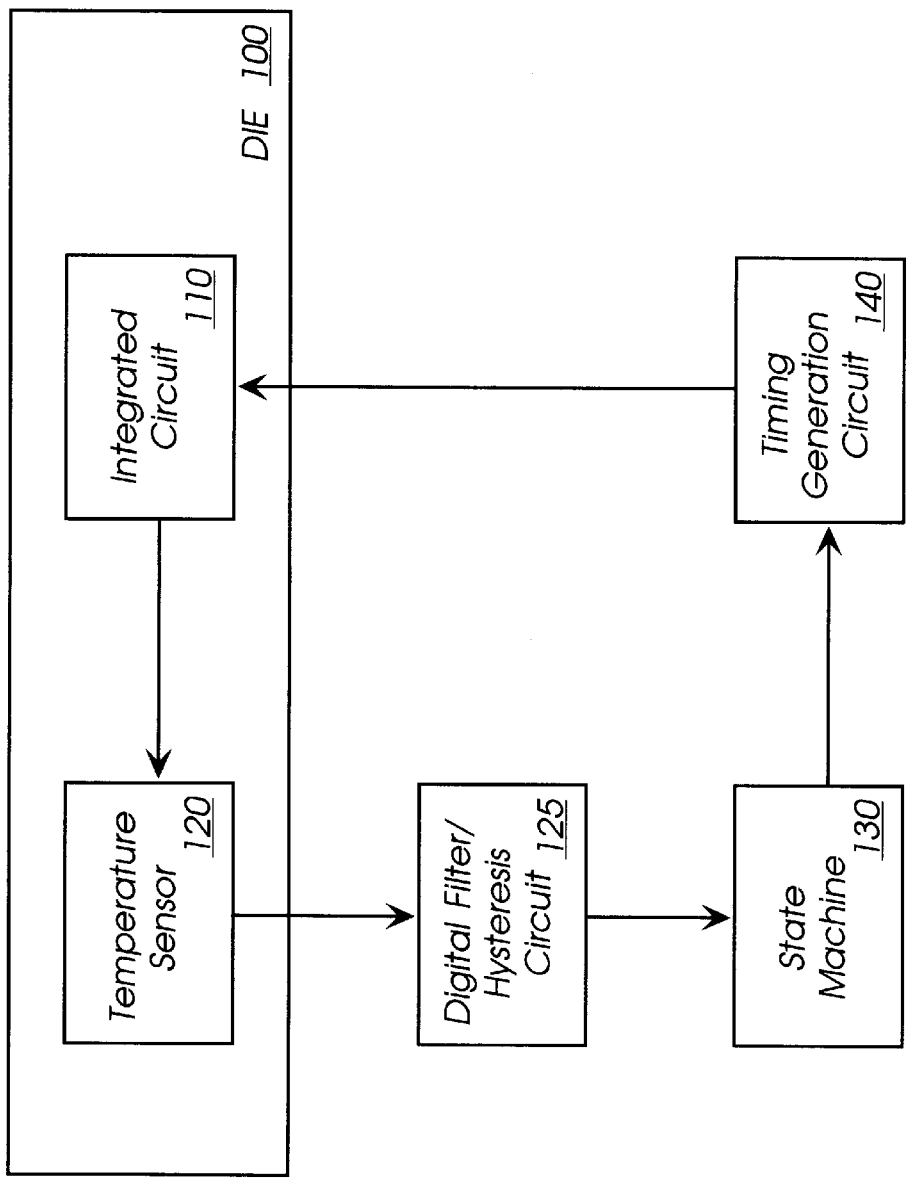
FIG. 1 is one embodiment of a block diagram of a power throttling arrangement.

FIG. 1 is one embodiment of a block diagram of an arrangement for providing power throttling for an IC. In the embodiment of FIG. 1, the state machine, digital filter/hysteresis circuit and the timing generation circuit are shown external to the die; however, one or more may be included on the die. In an alternative embodiment, some of the components are not integrated circuit components. The temperature sensor and the IC are manufactured on a common die to provide accurate junction temperature readings.

While power throttling does not require that the state machine and other circuitry be included on the same die as the IC (an integrated solution), doing so increases performance. For example, the response time between a temperature that is too high and reduction of the temperature is reduced. Also, the temperature at which power throttling is initiated may be increased. Thus, an integrated solution allows greater processor performance than a non-integrated solution.

Integrated circuit 110 is built on die 100 in any manner known in the art. More than one integrated circuit may be built on die 100. Thermal sensor 120 is also manufactured on die 100 because thermal sensor 120 senses the junction temperature of integrated circuit 110. In one embodiment, integrated circuit 110 is a processor from the Pentium® (e.g., Pentium®, Pentium® Pro, Pentium® II, Pentium® III) family of processors available from Intel Corporation of Santa Clara, Calif. Of course, any other processor and/or any other integrated circuit could also be used.

Digital filter/hysteresis circuit 125 receives an output signal from temperature sensor 120. Digital filter/hysteresis circuit 125 is optional and not required to practice the invention. However, as described in greater detail below, digital filter/hysteresis circuit 125 improves system performance in a system providing thermal management according to the invention.

State machine 130 receives an output signal from digital filter/hysteresis circuit 125 corresponding to the junction temperature of integrated circuit 110. State machine 130 controls power consumption of integrated circuit 110 in response to the output signal from temperature sensor 120 via digital filter/hysteresis circuit 125. In one embodiment, state machine 130 is coupled to control delivery of a clock signal to integrated circuit 110. For example, the clock signal delivered to integrated circuit 10 may be disabled for a predetermined period of time, or the clock signal delivered to integrated circuit 110 may be delivered at a reduced frequency for a predetermined period of time. Of course, other power consumption measures may be controlled by state machine 130.

In describing the invention three values are used with respect to power throttling. Maximum power (max. power) is the maximum power drawn by an IC. This value is used, for example, by system manufacturers and designers to determine power supply requirements and is also used to determine a temperature corresponding to maximum power. Thermal maximum (thermal max.) is used for cooling purposes.

Typical power is a temperature region corresponding to the IC running typical instruction sequences and is typically less than the thermal maximum value. As IC designs become more complex, the difference between typical power and maximum power, or thermal maximum, tends to get larger. Thus, cooling for maximum power is unnecessary and requires use of resources that could be used more effectively for other purposes.

In one embodiment, thermal sensor 120 generates an output signal initiating power reduction at a thermal maximum value. In one embodiment, the thermal maximum value is a temperature corresponding to steady state operation at 85% of maximum power. Because temperature lags power consumption, the output corresponding to thermal maximum temperature does not occur at the point where integrated circuit 110 consumes 85% of maximum power. Rather, integrated circuit 110 may operate at maximum power for a period of time before the thermal maximum value is reached. Of course, thermal maximum power may be a different percentage of maximum power.

In one embodiment, thermal sensor 120 compares the junction temperature of integrated circuit 110 to a programmable trip point corresponding to the thermal maximum value. When the junction temperature reaches the trip point, state machine 130 reduces power consumption of integrated circuit 110. In one embodiment, the programmable trip point is stored during class testing and is programmed into thermal sensor 120 using fuses in any manner known in the art.

During programming, integrated circuit 110 is heated to a predetermined temperature. Once heated, the trip code is calibrated by adjusting the trip code until thermal sensor 120 returns a tripped signal. By providing a programmable trip point, the invention allows each integrated circuit in a group of integrated circuits to be programmed to compensate for differences between integrated circuits, such as process differences, etc.

In one embodiment, power consumption is reduced by turning off a clock signal driving integrated circuit 110 for a first predetermined period of time. The clock signal is turned on after the first predetermined period of time for a second predetermined period of time. If the junction temperature still exceeds the thermal maximum value, the cycle is repeated. In one embodiment, the first predetermined. period of time is equal to the second predetermined period of time. Thus, the clock signal is turned on and off with a 50% duty cycle. Of course, other relationships between the first and second predetermined periods of time may be used. For example, the first predetermined period of time may be greater than the second predetermined period of time, or the second predetermined period of time may be greater than the first predetermined period of time.

During power throttling by turning the clock signal on and off, IC performance is a function of the duty cycle of the enabling and disabling of the clock signal. Thus, with a 50% duty cycle, the processor appears to be operating at half speed. In one embodiment, the duty cycle is selected to be greater than the ratio of the cooling capabilities of the platform to the maximum power consumption of the IC. Other duty cycles can also be used.

In one embodiment, digital filter/hysteresis circuit 125 provides a filtering functionality that prevents power throttling in response to circuit noise. The filtering functionality causes power throttling in response to a temperature value from temperature sensor 120 reaching the predetermined value for a predetermined period of time. Thus, power throttling is not triggered in response to a transient high temperature output from temperature sensor 120.

In one embodiment, digital filter/hysteresis circuit 125 provides a hysteresis functionality to prevent state machine 130 from changing states excessively. In one embodiment, an interrupt is caused each time the temperature sensor 120 output transitions through the thermal maximum value (e.g., above the thermal maximum value to below the thermal maximum value, or below the thermal maximum value to above the thermal maximum value). In order to prevent excessive transitions, which can cause excessive interrupts, state transitions occur after a predetermined period of time in a particular state. For example, when power throttling is triggered, a transition back out of power throttling can occur only after a predetermined period of time.

In one embodiment, both digital filter functionality and hysteresis functionality is provided by digital filter/hysteresis circuit 125. In alternative embodiments, either digital filtering or hysteresis is provided by digital filter/hysteresis circuit 125. As mentioned above, digital filter/hysteresis circuit 125 is not required to practice the invention.

While the invention may provide an integrated solution to power throttling based on programmable trip points, software-accessible registers may be provided to observe the effects of power throttling and to program various components used for power throttling. In one embodiment, registers are provided to monitor performance either with or without power throttling.

Figure 2:
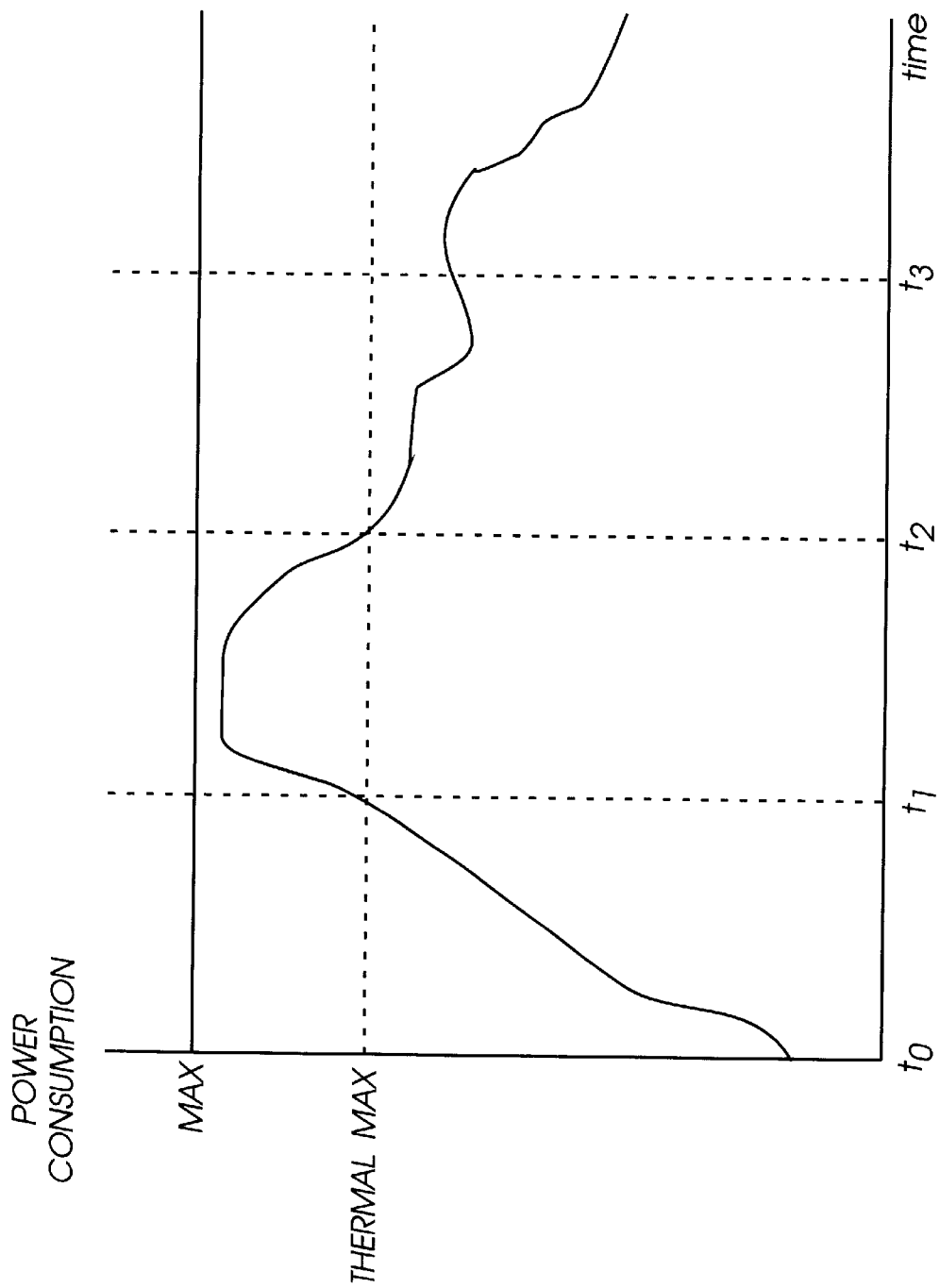
FIG. 2 is one embodiment of a graph of power consumption versus time.

FIG. 2 is one embodiment of a graph of power consumption versus time. The power consumption of FIG. 2 may be, for example, power consumption of a processor that is executing an application over a period of time. Generally, applications use circuit resources more efficiently under certain conditions and less efficiently under other conditions. When resources are used more efficiently more power is consumed because more of the circuit resources are in use.

During the time period between $t_0$ and $t_1$, the IC to which the graph of FIG. 2 corresponds is operating at less than 85% of maximum power, which is labeled thermal maximum in FIG. 2. During the time period between $t_1$ and $t_2$, the IC is operating near maximum power consumption. During this time period, the IC components are used efficiently in that most of the transistors and other circuit elements of the IC are being used. Continued use of the IC at this rate causes power throttling.

During the time period between $t_2$ and $t_3$, the IC operates near, but below, the power consumption rate defined as thermal maximum. During this time period, the components of the IC are used relatively efficiently; however, continued use at this rate will not cause power throttling to occur.

During the time period subsequent to $t_3$, power consumption is reduced. During this time, used of IC components becomes less efficient, which requires less power consumption. The less power that is consumed, the less heat is generated by the IC.

Figure 3A:
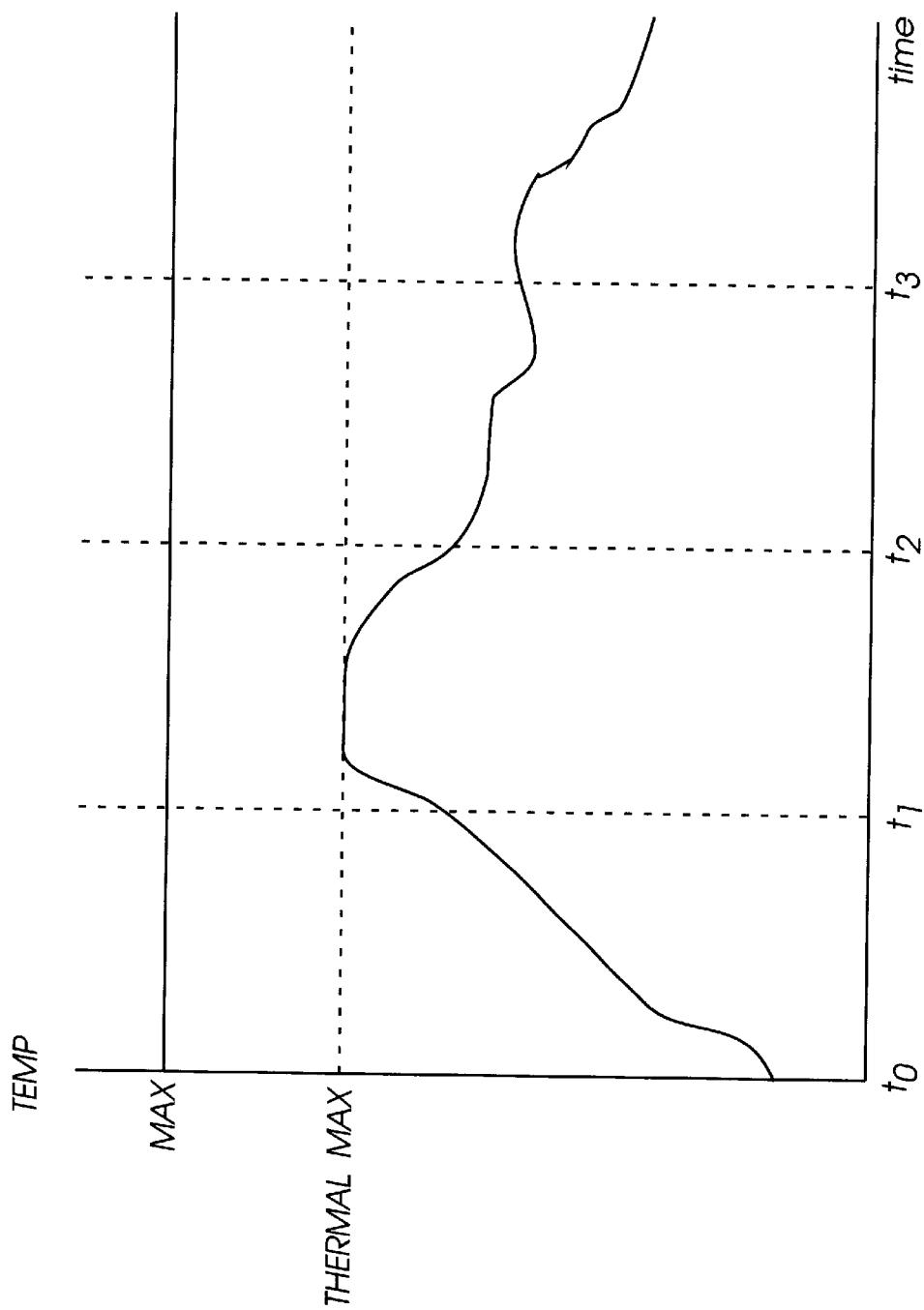
FIG. 3a is a graph of temperature versus time for thermal throttling according to one embodiment of the invention.

FIG. 3a is a graph of temperature versus time for thermal throttling according to one embodiment of the invention. For explanation purposes, the time periods of FIG. 2 correspond to the time periods of FIG. 3a.

During the time period between $t_0$ and $t_1$, the temperature of the IC increases as power consumption increases. During the time period between $t_1$ and $t_2$, temperature increases more rapidly as the IC operates near maximum power consumption.

As the temperature reaches the thermal maximum, power throttling occurs to reduce power consumption and thereby reduce IC temperature. Thermal throttling operates to clamp the temperature at the thermal maximum until $t_2$. After $t_2$, when power consumption is further reduced by decreased IC component utilization, the temperature of the IC decreases further.

Figure 3B:
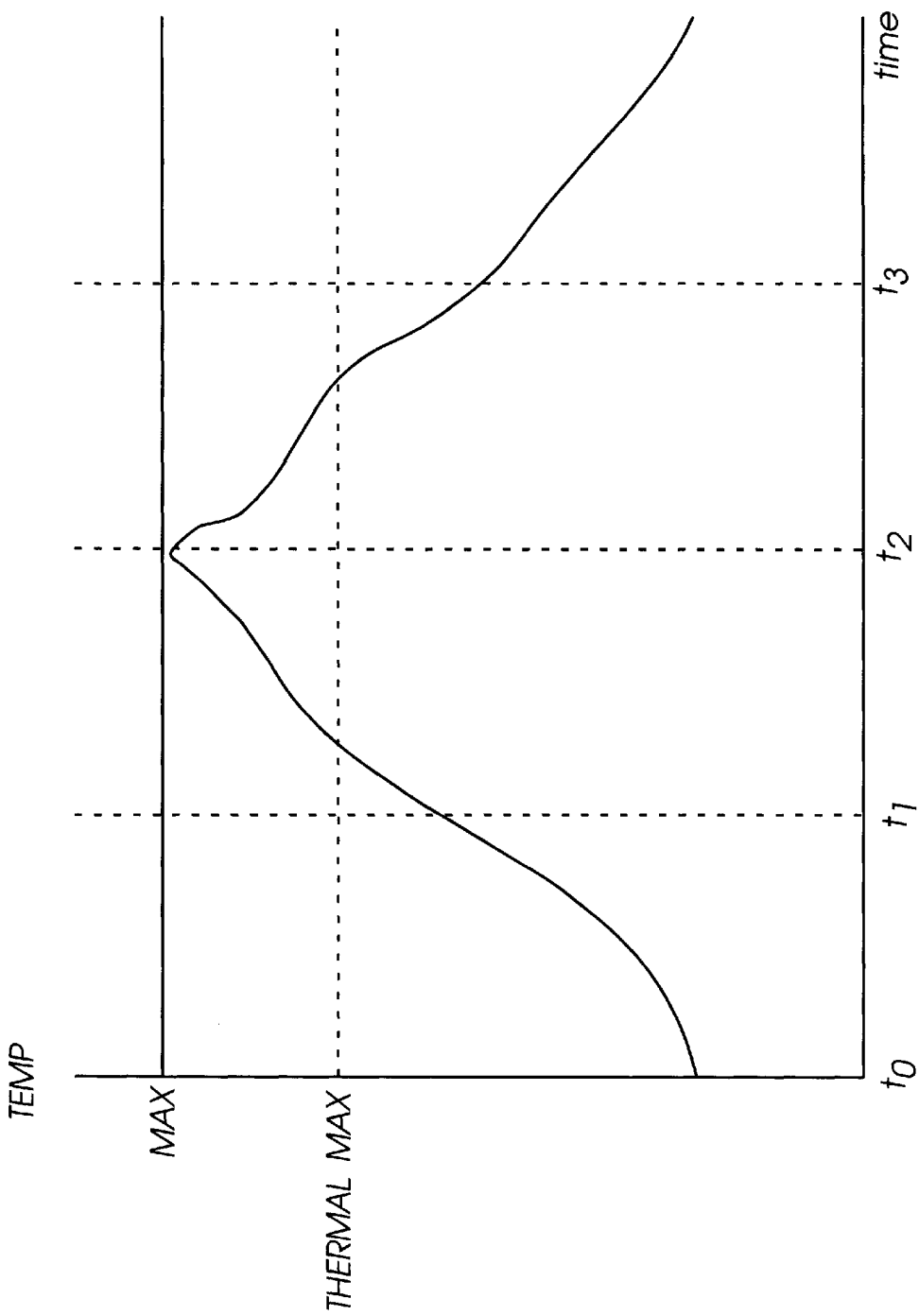
FIG. 3b is a graph of temperature versus time for a system without thermal throttling.

FIG. 3b is a graph of temperature versus time for a system without thermal throttling. The time periods of FIG. 3b also correspond to the time periods of FIG. 2. As the IC temperature increases from $t_0$ to $t_2$, the temperature exceeds the thermal maximum because thermal throttling is not applied. The IC temperature reaches the maximum allowable temperature at $t_2$.

When the IC temperature reaches the maximum allowable temperature, the IC is shut down, for example, by turning the clock signal off. If the IC is not shut down when the IC temperature reaches the maximum allowable temperature, a catastrophic failure can occur. Because the IC is shut down at $t_2$, the temperature of the IC decreases after $t_2$. However, the thermal solution of FIG. 3b requires the IC to reach an absolute maximum value and at that time the IC is shut down. Thus, the IC is not usable for some period of time. In contrast, thermal throttling allows the IC to continue operation at a reduced frequency in order to avoid reaching the maximum allowable temperature.

Figure 4:
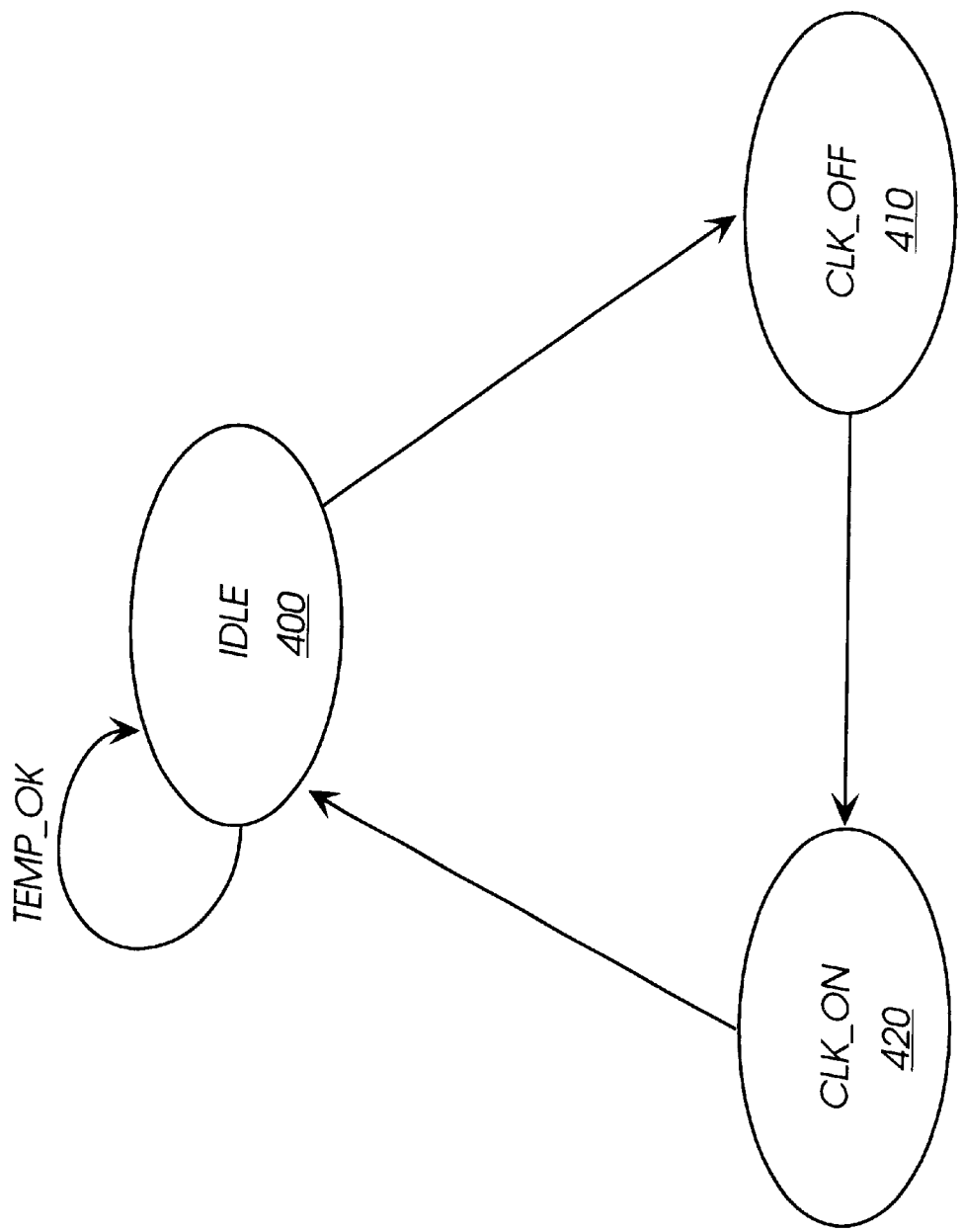
FIG. 4 is one embodiment of a state diagram for providing power throttling.

FIG. 4 is one embodiment of a state diagram for providing power throttling. The states described with respect to FIG. 4 refer to the state machine that controls power throttling and not to the IC to which power throttling is applied.

The state machine remains in idle state 400 while the temperature measured by the temperature sensor is less than the thermal maximum value (TEMP_OK). When the temperature sensor measures an IC junction temperature that is equal to or greater than the thermal maximum value, the state machine transitions to CLK_OFF state 410.

In state 410, the state machine disables the clock signal to the IC. In one embodiment, the state machine remains in state 410 for a first predetermined period of time and then transitions to CLK_ON state 420. In one embodiment, the state machine remains in state 420 for a second predetermined period of time and then transitions back to state 400.

In one embodiment, the first predetermined time during which the state machine remains in state 410 is 5 microseconds; however, other time periods may also be used. In one embodiment, the second predetermined time during which the state machine remains in state 420 is equal to the first predetermined time; however, other time periods that are either greater than or less than the first predetermined time may also be used.

In one embodiment, the invention provides thermal management adaptability. If the thermal management configuration does not keep the IC below the predetermined value sufficiently, the time period for which the clock signal is off (e.g., state 410) is increased. Similarly, if the thermal management configuration provides more IC cooling than is necessary, the time period during which the clock signal is off is decreased. In alternative embodiments, the time period during which the clock signal is on (e.g., state 420) can be adjusted.

In summary, one embodiment of the invention uses hardware components to switch a clock cycle off and on according to a predetermined pattern when the temperature of the IC reaches a predetermined value. Switching the clock cycle off for a short period of time typically cools the IC sufficiently. Thus, the invention provides an efficient, integrated thermal management solution.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:

determining a junction temperature for an integrated circuit;

comparing the junction temperature to a thermal maximum value, wherein the thermal maximum value is less than a temperature corresponding to maximum allowable power consumption for the integrated circuit; and reducing power consumption by the integrated circuit when the junction temperature is greater than the thermal maximum value, by turning off a clock signal to the integrated circuit for a first predetermined period of time, and turning on the clock signal for a second predetermined period of time, wherein the ratio of the first predetermined time to the second predetermined time is greater than or equal to the ratio of the thermal maximum value to the maximum power temperature.

2. The method of claim 1, wherein turning on and turning off are repeated until the junction temperature is less than the thermal maximum value.

3. The method of claim 1, wherein the thermal maximum value is programmable.

4. The method of claim 1, wherein the step of reducing power consumption comprises reducing a frequency of a clock signal to the integrated circuit.

5. An apparatus comprising:

means for determining a junction temperature for an integrated circuit;

means for comparing the junction temperature to a thermal maximum value, wherein the thermal maximum value is less than a temperature corresponding to maximum allowable power consumption for the integrated circuit;

means for reducing power consumption by the integrated circuit when the junction temperature is greater than the thermal maximum value;

means for turning off a clock signal to the integrated circuit for a first predetermined period of time; and means for turning on the clock signal for a second predetermined period of time, wherein the ratio of the first predetermined time to the second predetermined time is greater than or equal to the ratio of the thermal maximum value to the maximum power temperature.

6. The apparatus of claim 5, wherein the means for reducing power consumption comprises means for programming the thermal maximum value.

7. An apparatus comprising:

a integrated circuit manufactured on a die;

a thermal sensor manufactured on the die and thermally coupled to the integrated circuit;

a state machine coupled to the thermal sensor and to the integrated circuit, the state machine reducing power consumed by the integrated circuit in response to the thermal sensor detecting a junction temperature of the integrated circuit greater than a thermal maximum value, wherein the thermal maximum value is less than a maximum temperature value for the integrated circuit, wherein the state machine cyclically turns off a clock signal to the integrated circuit for a first predetermined period of time and turns on the clock signal for a second predetermined period of time, wherein the ratio of the first predetermined time to the second predetermined time is greater than or equal to the ratio of the thermal maximum value to the maximum power temperature, until the junction temperature is less than the thermal maximum value.

8. The apparatus of claim 7, wherein the state machine cyclically turns off a clock signal to the integrated circuit for a first predetermined period of time and turns on the clock signal for a second predetermined period of time until the junction temperature is less than the thermal maximum value.

9. The apparatus of claim 8, wherein the first predetermined time and the second predetermined time are programmable.

10. The apparatus of claim 7, wherein the thermal maximum value is programmable.

11. A processor comprising:

a thermal sensor that generates an output in response to a junction temperature of one or more integrated circuits in the processor;

a state machine coupled to receive the output from the thermal sensor, wherein the state machine reduces power consumption by the processor in response to the output of the thermal sensor being greater than a thermal maximum value, and further wherein the thermal maximum value is less than a temperature corresponding to a maximum power consumption by the processor, further wherein the state machine disables a clock signal to the one or more circuits of the processor for a first predetermined period of time and enables the clock signal for a second predetermined period of time, wherein the ratio of the first predetermined time to the second predetermined time is greater than or equal to the ratio of the thermal maximum value to the maximum power temperature.

12. The processor of claim 11, wherein the thermal sensor is manufactured on a common die with the processor.

13. The processor of claim 11, wherein the state machine disables a clock signal to the one or more circuits of the processor for a predetermined period of time.

* * * * *

UNITED STATES PATENT AND TRADEMARK OFFICE
CERTIFICATE OF CORRECTION

PATENT NO.    : 6,393,374 B1
DATED         : May 21, 2002
INVENTOR(S)   : Rankin et al.

It is certified that error appears in the above-identified patent and that said Letters Patent is hereby corrected as shown below:

<u>Column 3,</u>
Line 4, delete "10", insert -- 110 --.

Signed and Sealed this

Seventeenth Day of September, 2002

*Attest:*

JAMES E. ROGAN
*Attesting Officer*   *Director of the United States Patent and Trademark Office*